July 1, 1947.                    W. CUNLIFFE                       2,423,177
                METHOD OF MAKING SHEAR PLATES FOR ELECTRIC SHAVERS
                              Filed Jan. 20, 1944
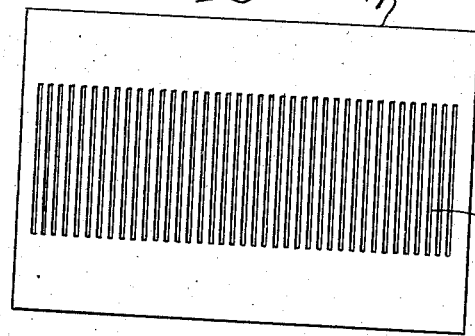
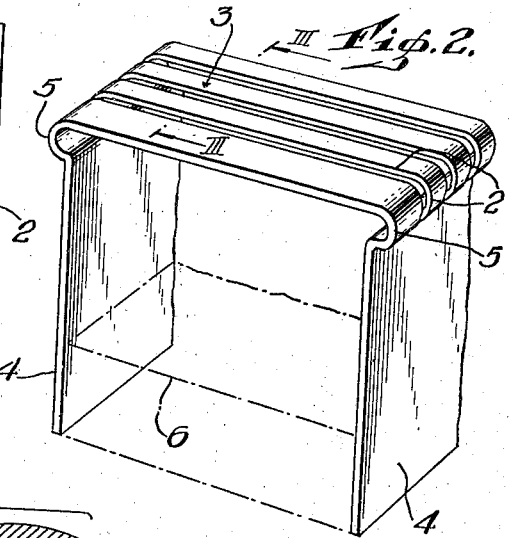
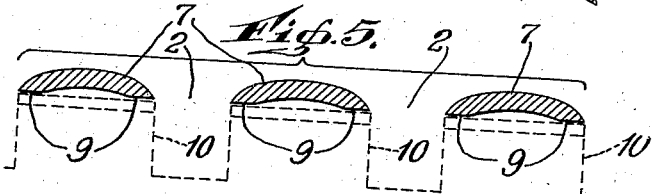
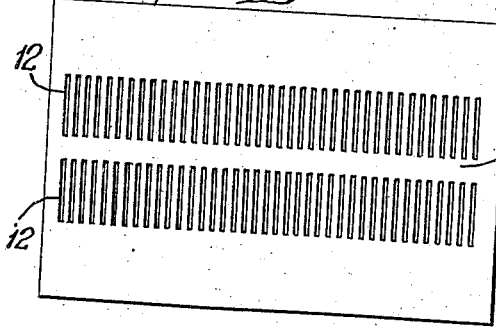
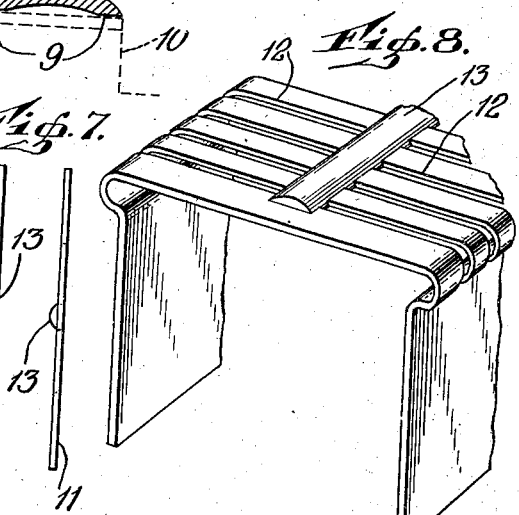
INVENTOR
BY Wilfred Cunliffe
   Reginald Hicks
                    ATTORNEYS Patented July 1, 1947

2,423,177

UNITED STATES PATENT OFFICE 2,423,177

METHOD OF MAKING SHEAR PLATES FOR ELECTRIC SHAVERS

Wilfred Cunliffe, Stamford, Conn., assignor, by mesne assignments, to Schick Incorporated, a corporation of Delaware Application January 20, 1944, Serial No. 518,932

3 Claims. (Cl. 76—104)

This invention relates to the manufacture of shear plates for electric shavers and particularly to the forming of such shear plates from thin sheet metal stock in such manner as to provide greater strength for the bars or metal portions intermediate the slots or other shear plate openings; that is, greater strength for any given thickness of stock. Another object of the invention is to provide an improved method of forming the cutting edges of the shear plate bars. Still another object is to form the shear plate in such manner as to minimize the frictional load on the motor as the result of the movement of the inner cutter over the nether surface of the shear plate.

These and other objects and advantages will be apparent from the following detailed description of a preferred form of the invention and from the accompanying illustrative drawings, of which Fig. 1 is a plan view of a pierced blank appropriate for use in forming a shear plate in accordance with the invention; Fig. 2 is a perspective view of a shear plate shell formed from the blank; and Figs. 3, 4 and 5 are very much enlarged sectional views through the shear plate bars illustrating different stages of manufacture; Fig. 6 is a view of a modified form of pierced blank; Fig. 7 an end view of the modified blank after partial forming and Fig. 8 a perspective view of a shear plate shell formed from such blank.

Referring first to Figs. 1 to 5, the shear plate to which the invention is here shown as applied for purposes of illustration is of the general type having a substantially flat, rectanglar, skin-engaging surface provided with elongated trasversely extending shearing bars separated or spaced by open-ended slots. The shear plate is formed from a blank 1 stamped out of sheet metal stock and pierced with a number of long parallel, closely spaced slots 2, as shown in Fig. 1. By a subsequent forming operation or operations, this blank is formed to the inverted U or channel shape shown in Fig. 2 to provide the top or shear plate proper, generally designated 3, having depending side walls 4. Suitable combing 5 is formed at the junctions of the shear plate and side walls, the slots extending across the shear plate, through the combing and down into the side walls in the usual or any preferred manner. In dotted outline and marked 6 is shown a suitable base block by which the side walls may be spaced and to which they may be secured, as by soldering, to complete the outer cutter unit. As usual, this unit or outer cutter is intended to receive any appropriately shaped and apertured or slotted inner cutter adapted to be reciprocated in contact with the nether surface of the shear plate to effect the shearing of the hairs protruding through slots 2.

Before the outer cutter is completed by the insertion of base block 6, but preferably after the shell has been formed as shown in Fig. 2, the shear plate bars between the shear plate slots 2, are subjected to a further forming operation. This is illustrated in Fig. 3, which shows three adjacent shear plate bars 7 on a much enlarged scale, the bars being sectioned on the line III—III of Fig. 2. By suitable dies the individual bars of the shear plate are formed to arcuate section transversely of their length, being curved outwardly; that is to say, outwardly away from the interior of the shell, or convex as viewed from the outside of the shell. By this means considerable strength or rigidity is imparted to the individual bars and they are found to be much less liable to bending or other distortion under the strains to which they are subjected during the actual cutting of hair.

The bars may be further treated in various ways but in accordance with this preferred form of the invention they are next subjected to a swaging operation by means of a suitable tapered punch which serves to reduce or taper the edge portions 8 of the bars, as shown in Fig. 4. Thereafter, the inner surface of the shear plate is finished, as by lapping, to remove sufficient metal from the edges of the bars to produce the flat surfaces 9 (Fig. 5) which bear against the tops of the bars 10 of the inner cutter, indicated in dotted outline.

In the result, highly effective cutting edges are produced along the edges of the shear plate bars bordering the slots 2; and, also, the slot entrances, being tapered, are effectively shaped to facilitate the cushioning of the skin into the spaces between the bars to bring the skin surface close to the shearing plane. Furthermore, since the outer faces of the shear plate bars are curved and lack the usual sharp outer corners, the skin-engaging face of the shear plate requires only a light buffing to give it a smooth, comfortable-feeling surface.

So far as the inner or nether surface of the shear plate is concerned, it will be apparent that the contact area, and hence the friction, between outer and inner cutters is reduced to a minimum, being very much less than is the case where the surfaces conform throughout the width and length of the shear plate bars.

In the modified form shown in Figs. 6 to 8, the blank 11 is so pierced as to provide two rows of slots 12 spaced by a blank central strip 13; and, as shown in Fig. 7 (which is an end or edge view of the blank), this central strip 13 may be formed to provide an outwardly curved rib which, when the blank is formed to its channel shape as shown in Fig. 8, extends longitudinally of the shear plate intermediate the two rows of slots 12. In all other respects the shear plate may be formed and finished as above described. As will be understood, the bars are thus doubly reinforced and high rigidity imparted to the shear plate as a whole, with the other advantages already pointed out in connection with the first described form of the invention.

The principles of the invention as applicable to other forms of shear plates will be readily apparent and the following is claimed:

1. The method of making shaver shear plates which comprises piercing a blank of thin sheet metal stock to form a plurality of relatively long, parallel, closely-spaced, alternate slots and bars therein, forming the blank into a shear plate of channel shape having combing at its side edges, bowing the individual bars to arcuate section transversely of their length to impart strength and rigidity thereto, swaging the bars to reduce their edge thickness, and lapping the inner surfaces of said bars to produce a plurality of flat surfaces on each bar.

2. The method of making shaver shear plates which comprises piercing a blank of thin sheet metal stock to form a plurality of relatively long, parallel, closely-spaced, alternate slots and bars therein, forming the blank into a shear plate of channel shape with the said slots and bars extending transversely and substantially continuously throughout the width of the skin-engaging portion of the shear plate, bowing the individual bars to arcuate section transversely of their length to impart strength and rigidity thereto, reducing the edge thickness of the bars, and lapping the inner surfaces of said bars to produce a plurality of flat surfaces on each bar.

3. The method of making shaver shear plates which comprises piercing a blank of thin sheet metal stock to form a plurality of relatively long, parallel, closely spaced, alternate slots and bars therein, forming the blank into a shear plate of channel shape with the said slots and bars extending transversely and substantially continuously throughout the width of the skin-engaging portion of the shear plate, bowing the individual bars to arcuate section transversely of their length to impart strength and rigidity thereto, reducing the edge thickness of the bars, and removing metal from the inner surfaces of said bars to produce a plurality of flat surfaces on each bar.

WILFRED CUNLIFFE.

REFERENCES CITED

The following references are of record in the file of this patent:

UNITED STATES PATENTS

| Number | Name | Date |
|---|---|---|
| 2,078,563 | Connolly | Apr. 27, 1937 |
| 2,107,055 | Jensen | Feb. 1, 1938 |
| 2,168,406 | Harris | Aug. 8, 1939 |
| 2,223,768 | Martin | Dec. 3, 1940 |
| 2,331,274 | Martin | Oct. 5, 1943 |
| 2,255,894 | Ormond | Sept. 16, 1941 |
| 2,220,166 | Martin | Nov. 5, 1940 |
| 2,182,067 | Bruecker | Dec. 5, 1939 |